May 19, 1942.　　　H. L. COLES　　　2,283,849

METHOD OF PRODUCING ALUMINA

Filed July 25, 1939　　　2 Sheets-Sheet 1

INVENTOR
Henry L. Coles
BY
Emery, Varney, Whittemore & Dix
ATTORNEYS

May 19, 1942.  H. L. COLES  2,283,849
METHOD OF PRODUCING ALUMINA
Filed July 25, 1939   2 Sheets—Sheet 2

Fig. 2.

$A = Al_2O_3$
$C = CaO$
$S = SiO_2$

AREA $\underline{A} = SiO_2$
" $\underline{B} = CS$
" $\underline{C} = C_3S_2$
" $\underline{D} = C_2S$
" $\underline{E} = C_3S$
" $\underline{F} = CaO$
" $\underline{G} = C_3A$ AREA $\underline{H} = C_5A_3$
" $\underline{J} = CA$
" $\underline{K} = C_2AS$
" $\underline{L} = C_3A_5$
" $\underline{M} = Al_2O_3$
" $\underline{N} = CAS_2$
" $\underline{P} = A_3S_2$ INVENTOR
Henry L. Coles
BY
Emery, Varney, Whittemore & Dix
ATTORNEYS Patented May 19, 1942

2,283,849

UNITED STATES PATENT OFFICE 2,283,849

METHOD OF PRODUCING ALUMINA

Henry L. Coles, University, Ala., assignor, by direct and mesne assignments, of nine-tenths to William Sokolec, Chicago, Ill., and one-tenth to Howard W. Dix, New York, N. Y.

Application July 25, 1939, Serial No. 286,368

8 Claims. (Cl. 23—141)

This invention relates to a process for producing alumina $Al_2O_3$, particularly an improvement upon the well-known Bayer process to adapt it to the low-cost production of alumina from high-silica ores, and has for an object the provision of improvements in this art.

The commercial preparation of aluminum differs from that of other common metals in that the oxide which is ultimately reduced to the pure metal, must be purified prior to the reduction. This is true because most impurities which are found in the aluminum producing ores, such as bauxite, are more easily reduced than the aluminum oxide. Hence a mass reduction process, such as is successfully employed with iron ores, is unsatisfactory because the reduced metallic impurities would be left with the aluminum. It is therefore preferable with most aluminum ores to first prepare the aluminum oxide, alumina $Al_2O_3$, and from this to prepare the pure aluminum.

Many methods for the preparation of commercially pure alumina have been developed. These may be roughly divided into three groups, (1) the acid extraction method, (2) the electro-thermic extraction method, and (3) the alkaline extraction method. There are a number of ores from which alumina may be extracted, the principal ones being cryolite, kaolin, bauxite, and miscellaneous clays. Commercially the alkaline extraction of alumina from bauxite by what is known as the Bayer process is by far the most common. The present invention is an improvement upon the Bayer process, particularly for use where high silica bauxite is treated.

In the Bayer process bauxite is digested with sodium hydroxide NaOH, commonly called caustic soda, to form a solution which is thought to carry sodium aluminum oxide $NaAlO_2$ or sodium aluminate. The iron oxide and some of the other impurities of the bauxite are not attacked by the sodium hydroxide and are filtered out of the aluminum solution as a "red mud." The alumina is crystallized and separated out and the sodium hydroxide together with some unprecipitated aluminum hydroxide left in the solution is concentrated by evaporation of water and re-used in the digester. The alumina is concentrated in a centrifuge and calcining kiln and stored ready for use in the electrolytic reducing process. The present invention, however, is not concerned with the electrolytic process but merely with the process of separating alumina from bauxite.

Now while iron oxide does not react with sodium hydroxide in the digester, the same is not true of the oxide of silicon, silica $SiO_2$. During the digestion there is apparently formed an insoluble sodium aluminum silicate which carries both soda $Na_2O$ and alumina into the red mud. With increasing silica content in the bauxite, both soda and alumina losses increase. This explains why low-silica bauxite ore is in great demand while high-silica bauxite ores are seldom used, although the supply is very great. In America bauxites are used which carry as high as 7% silica; in Europe where large deposits of low-silica bauxite are available it is seldom that bauxites containing over 5% of silica are used.

The present process makes it possible to use bauxites containing as much as 10% silica in competition with present processes with a bauxite containing a much smaller percentage of silica.

According to the present process lime or calcium carbonate which is relatively inexpensive is added to the bauxite and the mixture calcined together, and this calcined mixture of bauxite and lime is fed to the digester instead of bauxite alone, as formerly. This effects a very considerable saving in sodium hydroxide, reduces the loss of soda with the red mud, permits the use of soda ash $Na_2CO_3$ instead of the more expensive caustic soda $NaOH$, greatly reduces the time of the filtration process, and reduces the overall cost of the process.

The bauxite and lime or an equivalent amount of calcium carbonate must be used in certain proportions and calcined at certain temperatures to produce a silica compound which will not pass into solution in the digester. In this way the silica may be eliminated in the red mud by subsequent filtration. There have been previous processes which proposed to calcine a mixture of bauxite and lime but the proportions and temperatures suggested were not suitable for producing the results obtained by the present invention, as will be shown hereinafter by reference to a standard diagram of the ternary system involving the three important phases of alumina $Al_2O_3$, silica $SiO_2$, and lime $CaO$.

An illustrative embodiment of the invention will now be described, reference being made to the accompanying drawings, wherein:

Fig. 2 is a one-hundred per cent triangle diagram based on the ternary system involving the three phases, alumina $Al_2O_3$, silica $SiO_2$, and lime $CaO$, showing critical temperatures in dotted lines and solidification phases from the liquid in heavy web-like lines, and also showing the ranges of mixtures and temperatures employed in the present invention.

Figure 1:
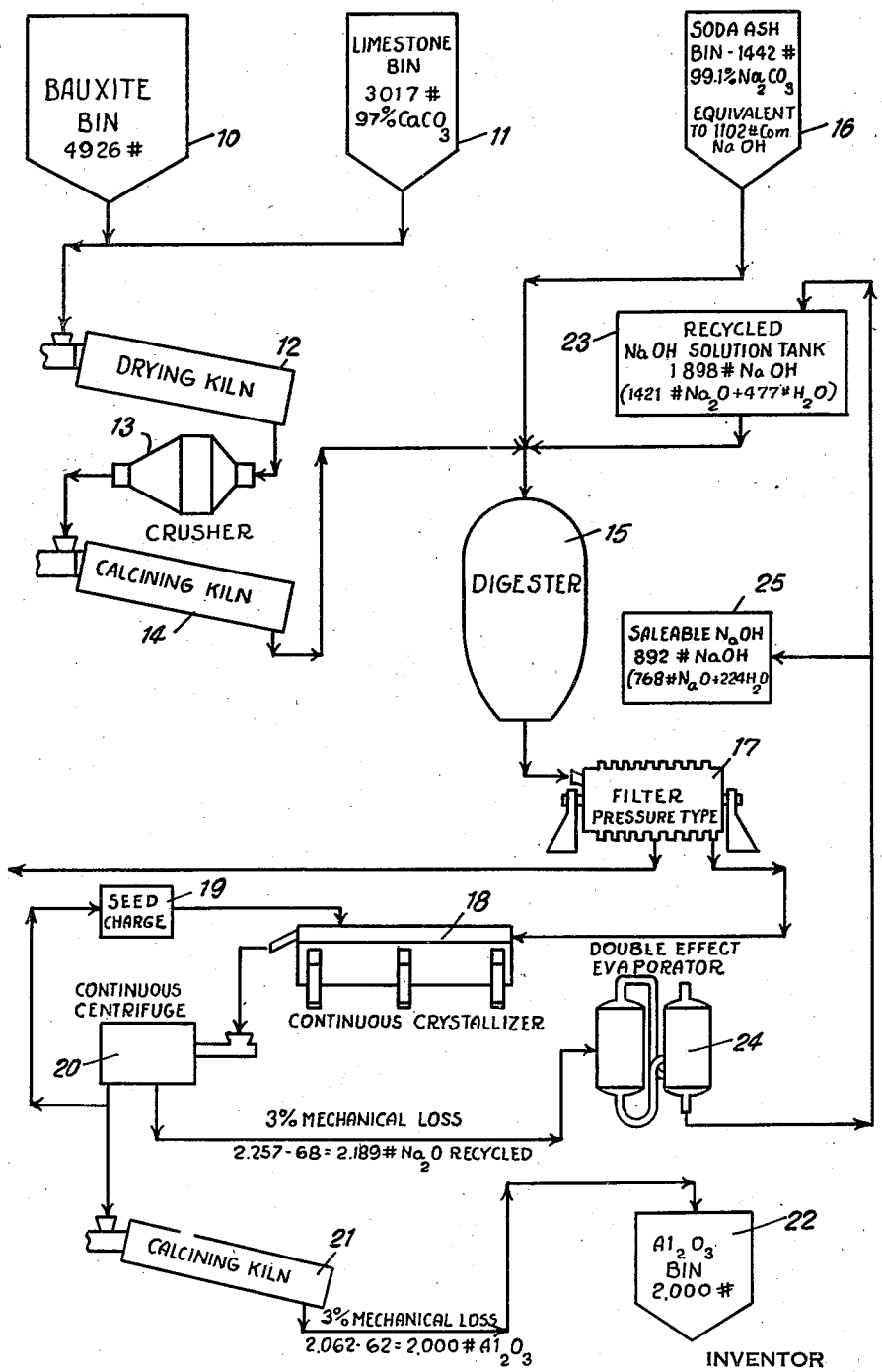
Fig. 1 is a flow sheet of one example of the improved process.

According to the present process bauxite and calcium carbonate $CaCO_3$ are mixed and dried, then ground finely (80 to 100 mesh), then calcined together at about 1500° C. to 1600° C., and then treated in a digester or autoclave with caustic soda NaOH and sodium carbonate in a hot bath (about 170° C.) to form a sodium aluminate solution and an insoluble "red mud" which is filtered off. The sodium aluminate solution is treated in the presence of a seed charge of alumina crystals to form alumina crystals which are separated and removed. The solution of sodium hydroxide and the remaining uncrystallized alumina are concentrated and returned to the digester. Make-up sodium hydroxide or the equivalent of sodium carbonate is added to the digester along with that which is returned. Inasmuch as sodium carbonate may be used satisfactorily in the digester under this invention, a part of the more expensive sodium hydroxide may be taken off and sold. The precipitated alumina is centrifuged and calcined ready for storage until used in the subsequent electrolytic process.

Assuming that 106 parts of sodium carbonate are added for every 56 parts of lime, the lime and the sodium carbonate react to give insoluble calcium carbonate and sodium hydroxide. Sodium carbonate must be added to render the calcium compounds totally insoluble. The resulting sodium hydroxide (less mechanical losses) may be removed from the system and sold.

Assuming, according to the preferred form of the invention, that it is desired to make one ton, 2,000 lbs., of alumina there will be required 4,926 lbs. of bauxite ore if ore of the following composition is used:

| | Per cent |
|---|---|
| $Al_2O_3$ | 58.2 |
| $SiO_2$ | 9.6 |
| $Fe_2O_3$ | 1.5 |
| $TiO_2$ | 2.8 |
| Volatile | 27.9 |

With such a high silica ore, having 9.6% silica in the example given, there will be used 3,017 lbs. of lime stone (assumed to be 97% dry calcium carbonate), equivalent to 1,640 lbs. of CaO.

The bauxite may be supplied from a bin 10 and the calcium carbonate from a bin 11. The mixture is passed to a rotary drying kiln 12 and heated to a temperature of from 650 to 815° C. The heating treatment is sufficient to drive off carbon dioxide from the calcium carbonate to leave lime CaO with the dried bauxite. Then it is crushed to 80–100 mesh in a crusher 13, after which it is passed to a rotary calcining kiln 14 where it is sintered at from 1500° C. to 1600° C. This mixture when calcined at these temperatures gives an insoluble calcium aluminum silicate and a soluble calcium aluminate. Instead of using calcium carbonate it is possible to use an equivalent amount of lime CaO. Or magnesium oxide may be used instead of lime, in the ratio of their relative molecular weights, that is, 40 lbs. of MgO for 56 lbs. of CaO. The calcining temperatures may be reduced by approximately 100° C. if spar is added.

The calcined mixture of bauxite and lime is passed to a digester 15 where it is treated with sodium hydroxide and sodium carbonate. The digester is heated to about 170° and constantly stirred. The sodium hydroxide may be formed from sodium carbonate or soda ash $Na_2CO_3$, the carbon dioxide passing off at the heat used in the digester to form soda $Na_2O$ which combines with the water present to form sodium hydroxide.

For the given amounts of bauxite, silica and calcium carbonate, the amount of sodium carbonate needed will be 1442 lbs. assumed to be 99.1% dry sodium carbonate. This is equivalent to 1102 lbs. of commercial sodium hydroxide. This may be supplied from a bin 16.

For the same ore, having 9.6% silica there would be a loss of 743 lbs. of sodium hydroxide by the conventional Bayer process. By the present process only 88 lbs. is lost. It is thus seen that there is a saving of 655 lbs. of sodium hydroxide.

From the digester 15 the material goes to a pressure filter 17 where the red mud is removed. The digester reactions will be approximately as follows:

| | | Pounds | | | Pounds |
|---|---|---|---|---|---|
| Bauxite, 3551 lbs. | $Al_2O_3$ | 2,861 | = | Sodium aluminate | 4,320 |
| | $SiO_2$ | 47 | | Red mud | 3,825 |
| | $Fe_2O_3$ | 74 | | | |
| | $TiO_2$ | 138 | | | |
| | CaO Imp. | 90 | | | |
| Soda ash | | 1,442 | | | |
| Recycled $Na_2O$ | | 1,421 | | | |
| CaO | | 1,641 | | | |
| Total | | 8,145 | | Total | 8,145 |

The red mud filtered off will have approximately the following analysis:

| | Pounds |
|---|---|
| CaO | 885 |
| $CaCO_3$ | 1,341 |
| Soda ash impurities | 13 |
| $Al_2O_3$ | 804 |
| $SiO_2$ | 473 |
| $Fe_2O_3$ | 74 |
| Limestone impurities | 90 |
| $TiO_2$ | 138 |
| Total | 3,818 |

Comparably, to make one ton, 2,000 lbs., of alumina by the usual Bayer process, using 4,782 lbs. of the same ore and 743 lbs. of NaOH (98%), equivalent to 564 lbs. $Na_2O$, and 2,821 lbs. of recycled NaOH equivalent to 2,186 lbs. of $Na_2O$, the digester reactions will be as follows:

| | | Pounds | | | Pounds |
|---|---|---|---|---|---|
| Bauxite, 3448 lbs. | $Al_2O_3$ | 2,783 | = | Sodium aluminate | 4,316 |
| | $SiO_2$ | 459 | | Red mud | 1,897 |
| | $Fe_2O_3$ | 72 | | | |
| | $TiO_2$ | 134 | | | |
| $Na_2O$ | | 2,750 | | | |
| NaOH Impur. | | 15 | | | |
| Total | | 6,213 | | Total | 6,213 |

And the red mud analysis of the usual Bayer process would be approximately as follows:

| | Pounds |
|---|---|
| $Al_2O_3$ | 721 |
| $SiO_2$ | 459 |
| $Fe_2O_3$ | 72 |
| $TiO_2$ | 134 |
| $Na_2O$ | 496 |
| NaOH Imp | 15 |
| Total | 1,897 |

In addition to the ability to successfully use high silica bauxite ores and the saving in soda ash, it has been found that by using the present process the filtration treatment can be performed almost 7 or 8 times as fast as in the usual Bayer process.

The solution containing the sodium aluminate is passed to a continuous crystallizer 18 to which a seed charge of alumina crystals is added as at 19. By cooling and stirring, the alumina is crystallized out and passed to a centrifuge 20 which removes some of the water. More of the water may be removed by a rotary calcining kiln 21, and the final material stored in a bin 22.

The $Na_2O$ solution left from the crystallization is returned from the centrifuge 20 to a tank 23, being concentrated on the way in a plural effect evaporator 24. If desired, some of the $Na_2O$ may be sold as indicated by the block 25. It has been assumed that 1,898 lbs. of NaOH or 1,421 lbs. of $Na_2O$ may be recycled through the digester and 992 lbs. of NaOH or 768 lbs. of $Na_2O$ may be sold.

Using the same high-silica ore and producing the same amount of alumina, the present process shows a saving of approximately 14% over the usual Bayer process.

For ores containing different amounts of silica different amounts of limestone or lime will be used. In the example given there is used 3017 lbs. of limestone $CaCO_3$ or 1641 lbs. of lime CaO for 473 lbs. of silica $SiO_2$ and 2866 lbs. of alumina $Al_2O_3$. This is equal to 112 parts of lime to 60 parts of silica and 37.3 parts of lime to 102 parts of effective alumina $Al_2O_3$, and corresponds to a composition lying between the lines 31 and 32 on the accompanying diagram which will now be explained.

The effective alumina is the total alumina minus 102 parts of alumina for every 60 parts of silica. This point for the typical bauxite mentioned, has the composition:

| | Per cent |
|---|---|
| Lime | 32.9 |
| Alumina | 57.6 |
| Silica | 9.5 |

The following proportions of lime, alumina and silica are recommended:

*Lower boundary*

112 parts of lime for each 60 parts of silica.
33.6 parts of lime for each 102 parts of effective alumina.

This, for the typical bauxite mentioned, has the composition:

| | Per cent |
|---|---|
| Lime | 31.8 |
| Alumina | 58.5 |
| Silica | 9.7 |

*Upper boundary*

56 parts of lime for each 60 parts of silica.
56 parts of lime for each 102 parts of effective alumina.

This, for the typical bauxite mentioned, was the composition:

| | Per cent |
|---|---|
| Lime | 37.2 |
| Alumina | 53.9 |
| Silica | 8.9 |

The calcining temperature should be between 1500° C. and 1600° C. but may be about 100° C. lower if spar is added.

The apices of the triangle are taken to represent 100% of silica $SiO_2$ (at the top), lime CaO (at the left), and alumina or corundum $Al_2O_3$ (at the right). As usual in a ternary diagram of this sort the base lines represent mixtures of the two components shown at the ends of the lines and any point inside the triangle represents a mixture of the three phases, the total percentages by weights in every case adding up to 100%.

In a discussion of the diagram only the lime, the alumina and the silica of the kiln charge are included. Except at the apices, the lime CaO is referred to on the diagram as C, the alumina $Al_2O_3$ as A, and the silica $SiO_2$ as S. The impurities, such as $Fe_2O_3$, $TiO_2$, MgO, etc., have little effect when present in small quantities other than to reduce the melting point slightly, so will be disregarded in the diagram. Any point on the diagram represents the chemical composition of any mixture of CaO, $Al_2O_3$ and $SiO_2$. Temperature or isothermal lines have also been placed on the diagram to indicate approximately at what temperatures the various reactions occur.

There have also been placed on the diagram heavy black lines forming a web-like design. The areas mapped in this design indicate the bounds in which certain compounds separate out on cooling mixtures of $Al_2O^3$, CaO and $SiO_2$ from the molten state. The area A indicates S, the area B indicates CS, the area C indicates $C_3S_2$, the area D indicates $C_2S$, the area E indicates $C_3S$, the area F indicates C, the area G indicates $C_3A$, the area H indicates $C_5A_3$, the area J indicates CA, the area K indicates $C_2AS$, the area L indicates $C_3A_5$, the area M indicates A, or corundum, the area N indicates $CAS_2$, and the area P represents $A_3S_2$. This information, as well as the isothermal lines, was taken from the Journal of the American Ceramic Society, vol. 16, pg. 525, 1933, and is also found in the International Critical Tables, vol. 4, pg. 93, Fig. 45.

The possible compositions of the bauxites (the important constituents of which are alumina $Al_2O_3$ and silica $SiO_2$) will lie upon the right hand side of the triangle, that is, upon the base line joining $Al_2O_3$ and $SiO_2$. This may also be referred to as the CaO base line because the proportion of CaO is zero along this line. If a certain mixture of alumina and silica is chosen, for example, the 90% alumina and 10% silica, that is, the high silica bauxite with which the present invention may advantageously be used, and successive additions of lime are made, the composition of the resulting mixture will move along the composition line joining the point 90% A, 10% S and the point CaO. This line is dotted and referred to by the numeral 30 in Fig. 2. The bauxite here considered will have the composition $Al_2O_3$, 58.2%, $SiO_2$, 9.6%, $Fe_2O_3$, 1.5%, $TiO_2$, 2.8%, and volatile matter 27.9%.

Until enough lime is added so that the composition is represented by the point $m$, which is the point of intersection of the composition line 30 with the boundary between corundum field M and the $C_3A_5$ field L, the bulk of the sinter or calcine product is corundum $Al_2O_3$ accompanied by various amounts of $A_3S_2$ and $SiO_2$, $CAS_2$ and $A_3S_2$, $CAS_2$ and $C_2AS$, or $C_2AS$ and $C_3A_5$, the first liquids appearing at the points 1, 7, 9 and 11, respectively.

There is shown a line 31 joining the points $C_3A_5$ and $C_2AS$. This is known as an "Alkamades line," that is, a line connecting phases or chemical compounds which can exist together at a temperature where a reaction can take place. The compositions of the calcine product lying between the point $m$ and the point $n$ where the composition line 30 intersects the Alkamades line 31 will have $C_3A_5$ as the principal phase, accompanied by $C_2AS$ and $Al_2O_3$. The first liquid will appear at the temperature and will have the composition which is represented by the point 11.

There is shown another Alkamades line 32 joining the points $C_2AS$ and CA. The point of intersection of the composition line 30 with the Alkamades line 32 is designated by the letter $p$. When the composition of the sinter lies between the points $n$ and $p$, the principal phase will be $C_3A_5$ accompanied by CA and $C_2AS$, and the first liquid will appear at the temperature and will have the composition represented by the point 12. If the calcine product has the composition represented by point $n$, there will be only two phases present, $C_2AS$ and $C_3A_5$ and the first liquid will have the composition and will appear at the temperature which is represented by the point 10. The points $n$ and $p$ are not fixed points but depend upon or vary with the amount of silica in the bauxite. They do, however, always lie on the lines 31 and 32 respectively.

The composition which is herein proposed for use falls within the triangle $C_3A_5$—$C_2AS$—CA, which is shown in cross-hatching in Fig. 2. Best results should be obtained when the composition lies on the Alkamades line 31 joining the points $C_3A_5$ and $C_2AS$, although any composition in the triangle should give equally satisfactory results with larger lime consumption. Compositions containing less lime than those falling within the triangle result in the formation of materials which are insoluble in the digester. The composition of the calcine products containing more lime than those in this composition triangle do not result in a larger yield of alumina or a larger recovery of soda, but merely in a larger consumption of lime.

In certain previously proposed processes, the highest temperatures employed for calcining were 1200° C. This is inadequate as no pyrochemical reactions take place until a higher temperature is reached. These previous processes depend upon the formation of $C_2AS$ to conserve the use of soda; but since the temperatures employed were not high enough for the formation of $C_2AS$, as clearly indicated by the standard isothermal lines of Fig. 2, the processes could not have been successful.

In the present process the calcining is effected at 1500° C. to 1550° C. and in other instances up to 1700° C.—unless spar is added, in which case the temperature is lowered by approximately 100° C.—and the resulting compounds will be $C_2AS$ and $C_3A_5$ or $C_2AS$, $C_3A_5$, and CA. The $C_3A_5$ and CA would react in the digester to produce $NaAlO_2$ and $CaCO_3$, the $C_2AS$ remaining unaffected.

From the accompanying ternary diagram, Fig. 2, it will be seen that lime is added to the bauxite and the mixture calcined at a temperature high enough to form an insoluble calcium aluminum silicate and soluble calcium aluminates. The upper limit is indicated on the diagram, Fig. 2, as being 1700° C. Thus the range for the final heat treatment according to this invention is from 1500° C. to 1700° C. Under such conditions the formation of those products is characterized by sintering or slight fusion, the particles tending to coalesce. It has been observed that this is carried out best between the small particles. The finer the subdivision, the better the coalescence. These details are not a part of the present invention except insofar as they describe what apparently takes place between the materials mentioned and within the temperature ranges specified.

When these products are treated in the digester with sodium hydroxide, which may be maintained by adding sodium carbonate, the calcium aluminates are decomposed into calcium carbonate, which is insoluble, and sodium aluminate, which is soluble. The sodium hydroxide which is formed along with this reaction and the sodium hydroxide which is added with the sodium carbonate reacts with the calcium aluminates to decompose it. This process has practically a 100% saving of sodium hydroxide since none of the sodium is combined with the silica.

The bauxite composition line 30 has been drawn for an ore containing 10% silica $SiO_2$ and 90% alumina or a bauxite ore containing about 7% silica. The typical analysis given earlier in the text would be represented by a line (30) terminating at a mixture of 14.5% silica and 85.5% alumina. For bauxite containing more or less silica the line would shift up or down at its right end. In any event, the lime, silica and alumina are mixed in such proportions and are calcined at such a temperature that there are formed a calcium aluminum silicate which is insoluble and calcium aluminates which are soluble in the digester bath of sodium hydroxide and sodium carbonate. The preferred mixture of lime and bauxite is that represented by the point $n$ where the bauxite composition line 30 intersects the Alkamades line 31 joining the points $C_2AS$ and $C_3A_5$. However, good results can be obtained, though with some loss of materials, with mixtures falling within the triangle drawn to the points $C_2AS$, $C_3A_5$ and CA, that is, the shaded triangle shown in Fig. 2. In common terms, this means that there will be 56 parts of lime to 60 parts of silica and 56 parts of lime to 102 parts of effective alumina as the upper limit; and 112 parts of lime for each 60 parts of silica and 33.6 parts of lime for every 102 parts of effective alumina as a lower limit. The term effective alumina is to be understood as the total number of molecular weights of alumina in the system less the number of molecular weights of silica in the system. The foregoing upper and lower limits expressed in terms of percentage will provide for the upper limit set by the point represented by the formula $C_2AS$ which had 41% of lime and 21.8% of silica and 37.2% of alumina and for a lower limit 0% silica and alumina and CaO at the point CA and $C_3A_5$. These points figure in percentages as follows CA (lime 35.4%, alumina 64.6%) and $C_3A_5$ (lime 24.7%, alumina 75.3%). In commercial operations, however, this particular invention has especially to do with bauxite which has silica greater than 3% and which has not heretofore been susceptible to known treatments.

The calcining temperature should be from 1500° C. to 1600° C., though it may be approximately 100° C. less if spar is added. By reference to Fig. 2 and the shaded triangle thereof, it will be noted that the upper temperature limit indicated is 1700° C. and the lower temperature limit is indicated as 1500° C., which temperatures were hereinbefore noted as critical, see short description of Fig. 2 above.

The aluminates formed in the calcining step react with the sodium carbonate and the sodium hydroxide to form sodium aluminate and calcium carbonate. The sodium hydroxide formed by the reaction of the lime and the carbonate gives a saleable product.

Magnesium oxide may be used to replace the lime CaO in the proportion of their molecular weights, that is, 40 parts of magnesium oxide to 56 parts of calcium oxide. The addition of magnesium oxide will give greater fluidity with a reduction of the required temperature. Dolomite limestone or limestone containing magnesium can, therefore, be used, giving a greater flexibility of plant location with reference to availability of the raw materials.

There is no excess lime in the system, all of it being combined to form di-calcium alumina silicate and one of the calcium aluminates. The sodium carbonate reacts with the lime in the calcium aluminate to give sodium hydroxide, a causticizing reaction.

It may be necessary, due to rates of reaction and chemical equilibrium, to use lime in excess of that to give a composition which will fall on line 31 in Fig. 2. In any event, it is desired that the composition of the lime-alumina-silica mixture will fall as close as possible to line 31, but as just remarked, to do this some excess lime may be needed. If some excess lime must be used, a corresponding amount of sodium carbonate must be added in the digester giving an increased amount of saleable sodium hydroxide.

It will be noted in the present process that the preferred operation is to mix the bauxite with the amount of lime between that which is enough to transform all of the silica and part of the alumina in the bauxite to $2CaO.SiO_2.Al_2O_3$ and the balance of the alumina to $3CaO.5Al_2O_3$ and that amount of lime which is sufficient to transform all of the silica and part of the alumina to $2CaO.SiO_2.Al_2O_3$ and the balance of the alumina to $CaO.Al_2O_3$, which amounts of lime will be from 24.7% to 41%, of silica from around 3% to 21.8%, and of the alumina from 75.3% to 37.2%. These amounts are shown in the cross-hatched triangle portion of the ternary diagram comprising Fig. 2 of the drawings.

The present process shows a saving in cost of approximately 14% over the standard Bayer process for the same raw materials. This new and improved process is particularly suited for high silica bauxite ores which cannot be economically handled at all by the standard Bayer and other known processes.

Filtration is easier with the present process, the permissible speed being seven or eight times that of other processes. This is an important factor in the successful employment of the invention.

An excess of sodium hydroxide is produced and this can be sold because cheaper soda ash can be used instead. The total cost of the process may be lowered in this manner because there is no loss of sodium hydroxide.

In general, the present process is believed to be a distinct advance in the art. While one embodiment of the invention has been particularly described to illustrate the principles and advantages of the invention, it is to be understood that the invention itself is not thus limited but may be variously embodied within the limits of the prior art and the scope of the subjoined claims.

I claim:

1. In the method of producing alumina from bauxite, the steps which comprise mixing bauxite and an amount of lime between that which is sufficient to transform all of the silica and part of the alumina present in the bauxite to $2CaO.SiO_2.Al_2O_3$, and the balance of the alumina to $3CaO.5Al_2O_3$ and that amount of lime which is sufficient to transform all of the silica and part of the alumina to $2CaO.SiO_2.Al_2O_3$ and the balance of the alumina to $CaO.Al_2O_3$, passing this mixture through a drying kiln, heating said mixture in said kiln to a temperature between 650° C. and 815° C. to dry it, then crushing this mixture to 80-100 mesh, then passing this so crushed mixture through a calcining kiln and heating said mixture in said kiln to a temperature from about 1500° C. to not more than 1700° C. to form an insoluble calcium aluminum silicate and soluble calcium aluminates.

2. In the method of producing alumina from bauxite, the steps which comprise mixing bauxite and an amount of lime between that which is sufficient to transform all of the silica and part of the alumina present in the bauxite to $2CaO.SiO_2.Al_2O_3$, and the balance of the alumina to $3CaO.5Al_2O_3$ and that amount of lime which is sufficient to transform all of the silica and part of the alumina to $2CaO.SiO_2.Al_2O_3$ and the balance of the alumina to $CaO.Al_2O_3$, said amounts of lime being from 24.7% to 41%, of silica from 3.5% to 21.8%, and of alumina from 75.3% to 37.2%, passing this mixture through a drying kiln, heating said mixture in said kiln to a temperature between 650° C. and 815° C. to dry it, then crushing this mixture to 80-100 mesh, then passing this so crushed mixture through a calcining kiln and heating said mixture in said kiln to a temperature from about 1500° C. to not more than 1700° C. to form an insoluble calcium aluminum silicate and soluble calcium aluminates.

3. In the method of producing alumina from high silica bauxite, the steps which comprise mixing bauxite and limestone, passing this mixture through a drying kiln, heating said mixture to between 650° and 815° C., thereby driving off carbon dioxide and leaving dried bauxite and an oxide of calcium, then crushing this last mixture to obtain a uniform mixture of from 80 to 100 mesh, then passing this so crushed mixture through a calcining kiln, heating said mixture in said kiln to a temperature from about 1500° C. to approximately 1700° C. whereby an insoluble calcium aluminum silicate and soluble calcium aluminates are formed, the amounts of CaO, $SiO_2$ and $Al_2O_3$ being in such proportion that these amounts represent a point within the shaded area of the ternary diagram shown in Fig. 2 of the drawings.

4. In the method of producing alumina from bauxite, the steps which comprise treating a mixture of bauxite and lime by passing this mixture through a drying kiln, heating said mixture to between 650° and 815° C., thereby leaving dried bauxite and an oxide of calcium, then crushing this last mixture to 80-100 mesh, then passing this so crushed mixture through a calcining kiln, heating said mixture in said kiln to a temperature from about 1500° C. to approximately 1700° C. whereby an insoluble calcium aluminum silicate and soluble calcium aluminates are formed, the amounts of CaO, $SiO_2$ and $Al_2O_3$ being in such proportion that these amounts represent a point within the shaded area of the ternary diagram shown in Fig. 2 of the drawings.

5. In the method of producing alumina from high silica bauxite, the step of crushing a mixture of calcium oxide and dried high silica bauxite to 80-100 mesh, and the step of heating the so crushed mixture to a temperature of at least 1500° C. and not more than 1700° C. and thereby producing a pyrochemical reaction whereby insoluble calcium aluminum silicate and soluble calcium aluminates are formed, the amounts of CaO, $SiO_2$ and $Al_2O_3$ being in such proportion that these amounts represent a point within the shaded area of the ternary diagram shown in Fig. 2 of the drawings.

6. A product in the production of $Al_2O_3$ comprising a mixture in granulated form of from 80- to 100 mesh of insoluble calcium aluminum silicate and soluble calcium aluminates resulting from heating a mixture of calcium oxide and dry high silica bauxite to a temperature between 1500° C. and 1700° C., the amounts of CaO, $SiO_2$ and $Al_2O_3$ being in such proportion that these amounts represent a point within the shaded area of the ternary diagram shown in Fig. 2 of the drawings.

7. In the method of producing alumina from bauxite, the steps which comprise mixing bauxite and an amount of lime between that which is sufficient to transform all of the silica and part of the alumina present in the bauxite to $2CaO.SiO_2.Al_2O_3$, and the balance of the alumina to $3CaO.5Al_2O_3$ and that amount of lime which is sufficient to transform all of the silica and part of the alumina to $2CaO.SiO_2.Al_2O_3$ and the balance of the alumina to $CaO.Al_2O_3$, said amounts of lime being from 24.7% to 41%, of silica from 3.5% to 21.8%, and of alumina from 75.3% to 37.2%, passing this mixture through a drying kiln, heating said mixture in said kiln to a temperature between 650° C. and 815° C. to dry it, then crushing this mixture to 80–100 mesh, then passing this so crushed mixture through a calcining kiln and heating said mixture in said kiln to a temperature from about 1500° C. to not more than 1700° C. to form an insoluble calcium aluminum silicate and soluble calcium aluminates, passing said silicate and calcium aluminates to a digester having a bath of sodium hydroxide and sodium carbonate, said sodium hydroxide including re-cycled sodium hydroxide, filtering the product from the digester to remove the insoluble silicate with red mud, crystallizing and separating out the alumina, returning some of the sodium hydroxide to the digester, and adding sodium carbonate to the digester to replace the sodium hydroxide which was removed.

8. In the method of producing alumina from bauxite, the steps of mixing about 3017 pounds of limestone $CaCO_3$, with an amount of bauxite providing about 473 pounds of silica $SiO_2$ and about 2866 pounds of alumina $Al_2O_3$, passing said mixture through a drying kiln at temperatures between 650° C. and 815°°C. to dry said mixture, then crushing the same to 80–100 mesh, then passing this so crushed mixture through a calcining kiln and heating the same to a temperature of from 1500° C. to not more than 1700° C. to form an insoluble calcium silicate and soluble calcium aluminates.

HENRY L. COLES.